(12) United States Patent
Saitoh et al.

(10) Patent No.: US 7,372,517 B2
(45) Date of Patent: May 13, 2008

(54) ELECTRO-OPTICAL DEVICE, PROJECTION DISPLAY APPARATUS, AND MOUNTING CASE

(75) Inventors: Hiromi Saitoh, Chino (JP); Tomoaki Miyashita, Shimosuwa-machi (JP); Hiroyuki Kojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 359 days.

(21) Appl. No.: 11/293,150

(22) Filed: Dec. 5, 2005

(65) Prior Publication Data

US 2006/0082697 A1 Apr. 20, 2006

Related U.S. Application Data

(63) Continuation of application No. 10/799,619, filed on Mar. 15, 2004, now Pat. No. 7,038,742.

(30) Foreign Application Priority Data

Mar. 27, 2003 (JP) ............................. 2003-088812

(51) Int. Cl.
*G02F 1/1335* (2006.01)
(52) U.S. Cl. ...................................... 349/58
(58) Field of Classification Search ............ 349/58–60, 349/5, 16, 63–65; 361/681
See application file for complete search history.

(56) References Cited

U.S. PATENT DOCUMENTS 5,528,403 A 6/1996 Kawaguchi et al.

6,906,774 B2 6/2005 Saitoh

FOREIGN PATENT DOCUMENTS

| JP | 4-007519 | 1/1992 |
|---|---|---|
| JP | 2000-147472 | 5/2000 |
| JP | 2000-258756 | 9/2000 |
| JP | 2001-183627 | 7/2001 |
| JP | 2002-107698 | 4/2002 |
| JP | 2004-045680 | 2/2004 |
| JP | 2004-258280 | 9/2004 |
| WO | WO 98/36313 | 8/1998 |

*Primary Examiner*—Thoi V. Duong
(74) *Attorney, Agent, or Firm*—Oliff & Berridge, PLC

(57) ABSTRACT

It is possible to display high quality images by reducing or preventing heat accumulation in an electro-optical device, reducing or preventing undesired force from being applied to the electro-optical device due to the expansion and contraction of a mounting case, and reducing or preventing dislocation of the electro-optical device in the mounting case. The electro-optical device having an image display region, on which projection light from a light source is incident light, is encased in the mounting case constituted of a plate and a cover. One of the plate and the cover includes a resin member to fix the electro-optical device to the mounting case and a metal member including a window corresponding to the image display region in the electro-optical device.

11 Claims, 12 Drawing Sheets

ELECTRO-OPTICAL DEVICE, PROJECTION DISPLAY APPARATUS, AND MOUNTING CASE

This is a Continuation of application Ser. No. 10/799,619 filed Mar. 15, 2004. The entire disclosure of the prior application is hereby incorporated by reference herein in its entirety.

BACKGROUND OF THE INVENTION

1. Field of Invention

The present invention relates to a mounting case to accommodate an electro-optical device, such as a liquid crystal panel, which is used as a light valve of a projection display apparatus, such as a liquid crystal projector, an electro-optical device encased in a mounting case, in which the electro-optical device is accommodated and a projection display apparatus including the electro-optical device encased in the mounting case.

2. Description of Related Art

In general in the related art, when a liquid crystal panel is used as a light valve of a liquid crystal projector, the liquid crystal panel is not provided in an exposed state on a console, etc., constituting the liquid crystal projector. But it is accommodated or encased in a suitable mounting case and then the mounting case including the liquid crystal panel is provided on the console, etc.

This is because the liquid crystal panel can easily be fixed to the case by suitably providing screws in the corresponding mounting case.

In the liquid crystal projector, the light emitted from a light source is projected onto the liquid crystal panel encased in the mounting case as focused light. Light passing through the liquid crystal panel is enlarged and projected on the screen to display images. In such a liquid crystal projector, since the enlarged projection is generally predetermined, relatively intense light emitted from a light source, such as a metal halide lamp is used.

However, in this construction, first, there is a problem in that the temperature of the liquid-crystal-panel encasing mounting case, particularly of the liquid crystal panel rises. The rise in temperature causes a rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then variations in the transmittance are generated at so-called hot spots. Thus, the quality of projected images deteriorates.

SUMMARY OF THE INVENTION

However, the liquid crystal panel encased in the mounting case according to the related art has the following problems. That is, the mounting case is commonly constituted of a plurality of parts, such as a plate and a cover. The liquid crystal panel encased in the mounting case is obtained by assembling the plurality of parts with the liquid crystal panel. However, according to the related art, each of the plurality of parts is made of a single material. For example, the cover is made only of a resin or a metal.

In such a case, the following problems occur. For example, when the cover is made only of the resin, since the resin does not easily radiate heat, the rise in temperature of the liquid crystal panel becomes more serious. When relatively intense light is emitted into the liquid crystal panel encased in the case, the temperature of the liquid crystal panel rises as mentioned above. However, when the cover is made only of the resin that does not easily radiate heat, the generated heat cannot easily pass through the cover and further to the mounting case. Therefore, the heat is easily accumulated in the liquid crystal panel. As a result, the characteristics of the liquid crystal more significantly deteriorate and the hot spots increase.

However, when the cover is made only of the metal, problems accompanied by the rise in the temperature of the liquid crystal panel occur. In this case, unlike the resin, since the metal is a material having a high thermal conductivity, when the temperature of the liquid crystal panel rises, the heat is easily transmitted to the cover and further to the mounting case. However, when the heat is transmitted to the cover, that is, when the cover absorbs the heat, the cover is transformed due to thermal expansion to thus deviate the position of the electro-optical device in the mounting case. However, when the cover cools, there is a problem in that the cover contracts, to the contrary, to thus apply compressive force to the liquid crystal panel. When the compressive force is applied to the liquid crystal panel, the substrate that constitutes the liquid crystal panel may be undesirably twisted or the cell gap that is the thickness of a liquid crystal layer may be partially changed. Therefore, distortion, such as a color irregularity, may be generated in the images.

In order to address the above problems, the present invention provides an electro-optical device encased in the mounting case capable of displaying high quality images by reducing or preventing heat accumulation in the electro-optical device, by reducing or preventing undesired force from being applied to the electro-optical device due to the expansion and contraction of the mounting case, and reducing or preventing dislocation of the electro-optical device in the mounting case and a projection display device including the same. In addition, the present invention provides a mounting case suitable for the electro-optical device encased in the mounting case.

In order to address the above problems, the electro-optical device encased in the mounting case according to an aspect of the present invention includes an electro-optical device having an image display region on which light from a light source is incident light, and a peripheral region around the image display region, and a mounting case including a plate disposed so as to face one surface of the electro-optical device and a cover whose portion of the cover abuts against the plate, at least a portion of the peripheral region of the electro-optical device is held by at least one of the plate and the cover, at least one of the plate and the cover includes a resin member to fix the electro-optical device to the mounting case and a metal member having a window corresponding to the image display region in the electro-optical device.

According to the electro-optical device encased in the mounting case of an aspect of the present invention, the electro-optical device having the image display region, on which the projection light from the light source is incident light, is accommodated into the mounting case including the plate and the cover. The projection light is incident light from a window provided in "the metal member", and is emitted from the window after passing through the electro-optical device. The electro-optical device includes, for example, a liquid crystal device or a liquid crystal panel that is mounted as a light valve of the projection display apparatus. In addition, the mounting case may have an additional function, such as a light shielding function, to reduce or prevent the leakage of light in the peripheral region of the electro-optical device and the entrance of the stray light from the peripheral region into the image display region by partially covering at least a portion of the peripheral region of the electro-optical device.

In an aspect of the present invention, particularly, at least one of the plate and the cover (hereinafter, "cover") includes a resin member to fix the electro-optical device to the mounting case and a metal member having a window corresponding to the image display region in the electro-optical device. Therefore, since the cover that constitutes the mounting case according to an aspect of the present invention is not made only of either the resin or the metal like that of the related art, it is possible to reduce or prevent the occurrence of the above-mentioned various problems in that the cover does not easily radiate heat in case the cover is made only of the resin and that the color irregularity in images is not generated due to thermal contraction in case the cover is made only of the metal.

In particular, according to an aspect of the present invention, since a resin member assumed to be slightly transformed by heat is used to fix the position of the electro-optical device within the mounting case, it is possible to firmly fix the electro-optical device to the mounting case. That is, when a metal material is used to fix the electro-optical device to the mounting case, it is much likely that the position of the electro-optical device will deviate due to the thermal expansion and that contractible force will be applied to the electro-optical device during the cooling of the cover. However, according to an aspect of the present invention, it is possible to reduce or prevent the occurrence of such problems. However, since the metal having high thermal conductivity exists in the cover according to an aspect of the present invention, it is possible to relatively evenly deprive the electro-optical device of heat and to reduce or prevent heat from being accumulated in the electro-optical device.

In short, according to an aspect of the present invention, it is possible to effectively gain the advantages of both the resin and the metal.

In the cover according to an aspect of the present invention, the remaining part, other than the resin member to fix the electro-optical device, may be made of the metal member. In this case, the cover is made of the resin member and the metal member. Since the ratio of the metal member to the resin member is relatively large, it is possible to effectively reduce or prevent heat accumulation in the electro-optical device.

In manufacturing the cover according to an aspect of the present invention, which is obtained by associating the resin member and the metal member, it is preferable to use a manufacturing method in which the resin member is insert-molded.

In an aspect of the electro-optical device encased in the mounting case according to the present invention, the resin member is provided so as to surround the electro-optical device.

According to this aspect, since the resin member surrounds the electro-optical device, it is possible to firmly fix the electro-optical device to the mounting case. To be specific, for example, when the electro-optical device is rectangular in plan view, the resin member may be rectangular-shaped in plan view so as to surround the rectangle. The resin member may be constituted of small members (the small members constitute "the resin member" as a whole) divided into four, three, or two along the respective sides of the rectangle.

In another aspect of the electro-optical device encased in the mounting case according to the present invention, at least one of the plate and the cover includes an attaching portion to attach the electro-optical device encased in the mounting case to an attached portion of a projection display device, and the attaching portion is provided in the resin member.

According to this aspect, it is possible to firmly attach the electro-optical device encased in the mounting case to the projection display device by the attaching portion. An appropriate three-dimensional case that is, for example, a part of the projection display device may be used as the attached portion. The specific aspects of the attaching portion are various. For example, the attaching portion may be constituted of a screw. In this case, it is possible to attach the electro-optical device encased in the mounting case to the projection display device by an attaching portion that is a screw and a female screw formed in the attached portion.

According to the present aspect, the attaching portion is included in the resin member. That is, according to the present aspect, the attaching portion to fix the mounting case to the projection display device is included in the resin member and assumed to be slightly transformed by heat, as mentioned above. Therefore, it is possible to firmly fix the electro-optical device to the mounting case by the resin member (refer to the above description) and to firmly fix the mounting case to the projection display device.

According to this aspect, the attaching portion includes attaching holes and cylinder members whose axes are aligned with lines that pass through the centers of the attaching holes.

According to this structure, it is possible to appropriately fix the cover to the attached portion by the cylinder. For example, when the internal circumference of the cylinder is threaded, it is possible to appropriately screw the cover to the attached portion.

Even if the internal circumference of the cylinder is not threaded, it is possible to easily and appropriately fix the cover to the attached portion by driving a stud or a wedge into the cylinder and injecting an appropriate adhesive between the stud or the wedge and the internal circumference of the cylinder.

In another aspect of the electro-optical device encased in the mounting case according to the present invention, at least one of a portion of the cover abutting against the plate and a portion of the case abutting against the cover is made of the metal member.

According to this aspect, since the part where the plate and the cover are abutted to each other is made of the metal member, heat is easily transmitted between the plate and the cover. Therefore, the heat exhausted from the electro-optical device easily passes through the plate and the cover.

Further, when only one of the cover and the plate mainly deprives the electro-optical device of the heat, it is possible to deprive the electro-optical device of the heat by only the heat capacity of the cover or the plate as a principle. However, according to the present aspect, it is possible to easily deprive the electro-optical device of the heat by the heat capacities of the cover and the plate. As mentioned above, according to the present aspect, it is possible to appropriately cool the electro-optical device.

In another aspect of the electro-optical device encased in the mounting case according to the present invention, the plate includes an engaging portion, the cover includes an engaged portion to be engaged with the engaging portion and at least one of the engaging portion and the engaged portion is provided in the metal member.

According to this aspect, since each of the plate and the cover includes an engaging unit and an engaged unit, it is possible to assemble the plate with the cover. Therefore, it is possible to make the mounting case firm (that is, the plate and the cover are not easily separated from each other). Therefore, it is possible to reduce or prevent the dislocation of the electro-optical device in the mounting case.

According to the present aspect, in particular, at least one of the engaging unit and the engaged unit is provided in the metal member. To be specific, when the cover is made of the resin member and the metal member, it means that the engaged unit is made of the metal. When the plate is made only of the metal, it means that the engaging unit is made of the metal. It is apparent that various combinations may be considered.

As mentioned above, when at least one of the engaging unit and the engaged unit, where the plate is connected to the cover, is made of the metal, heat is easily transmitted between the plate and the cover. Therefore, the heat exhausted from the electro-optical device easily passes through the plate and the cover. Further, when only one of the cover or the plate mainly deprives the electro-optical device of heat, it is possible to deprive the electro-optical device of heat by only the heat capacity of the cover or the plate as a principle. However, according to the present aspect, it is possible to easily deprive the electro-optical device of heat by the heat capacities of the cover and the plate.

As mentioned above, according to the present aspect, it is possible to appropriately cool the electro-optical device.

In order to obtain the above effect, both of the engaging unit and the engaged unit may be made of the metal.

In another aspect of the electro-optical device encased in the mounting case according to the present invention, the linear expansion coefficient of the resin member is substantially the same as that of the metal member.

According to this aspect, when light is radiated onto the cover to thus generate heat, there is no difference in thermal transformation between the resin member and the metal member. That is, according to the present aspect, since the linear expansion coefficient of the resin member is substantially equal to the linear expansion coefficient of the metal member, the resin member and the metal member expand or contract to the same degree, as long as the same thermal energy is applied to them. Therefore, for example, the position of the electro-optical device in the mounting case hardly deviates compared with the case where the resin member and the metal member expand or contract with different degrees in the cover. In short, according to the present aspect, it is possible to firmly fix the electro-optical device to the mounting case.

According to the present aspect, "the same degree" is a concept including a slight difference as well as a coincidence in the linear expansion coefficients of the resin member and the metal member. At this time, when there is a difference in the linear expansion coefficients of the resin member and the metal member to some degree, it is determined whether the degree exceeds the range of "the same degree" in consideration of various conditions, such as the size of the mounting case, the volumes of the resin member and the metal member occupied in the entire cover, the specific aspect in which the electro-optical device is fixed to the mounting case by the resin member, the contact area between the resin member and the electro-optical device, the intensity of projection light and the calorific value of the electro-optical device that receives the projection light.

In another aspect of the electro-optical device encased in the mounting case according to the present invention, the resin member and the metal member are provided in the cover, the metal member is made of a plate shaped member including a window, and the resin member is molded on the plate shaped member.

According to this aspect, it is possible to make the structures of the resin member and the metal member appropriate. For example, the electro-optical device has a typical structure in which a plurality of rectangular glass substrates overlap each other in plan view. However, in this case, for example, it is possible to arrange the metal member (that is, a plate shaped member) so as to contact the outermost surface of the glass substrates and to arrange the resin member so as to cover the side of the glass substrates. The resin member may be molded along the side of the glass substrates. Therefore, since the metal member contacts the outermost surface of the glass substrates, it is possible to effectively deprive the electro-optical device of heat. Also, since the side of the glass substrates is bound by the resin member, it is possible to firmly fix the electro-optical device to the mounting case.

In another aspect of the electro-optical device encased in the mounting case according to the present invention, one of the plate and the cover includes the resin member and the metal member and the other includes only the metal member.

According to this aspect, since the ratio of the metal member to the entire mounting case increases, it is possible to effectively deprive the electro-optical device of heat. In particular, in addition to the present aspect, in the aspect including the engaging unit and the engaged unit, since the engaging unit and the engaged unit are made of metal, heat is actively transmitted between the two. Therefore, it is possible to effectively cool the electro-optical device.

In order to address the above problems, a mounting case according to an aspect of the present invention includes a plate disposed so as to face one surface of an electro-optical device having an image display region on which light from a light source is incident light and a peripheral region around the image display region, and a cover to cover the electro-optical device, a portion of the cover abutting against the plate, the mounting case accommodating the electro-optical device by holding at least a portion of the peripheral region of the electro-optical device in at least one of the plate and the cover, and at least one of the plate and the cover including a resin member to fix the electro-optical device to the mounting case and a metal member having a window corresponding to the image display region in the electro-optical device.

According to the mounting case of an aspect of the present invention, it is possible to provide a mounting case appropriate to be used for the electro-optical device encased in the mounting case according to an aspect of the present invention.

In order to address the above problems, a projection display apparatus includes an electro-optical device encased in the mounting case according to an aspect of the present invention (including various aspects), a light source, an optical system to guide the projection light onto the electro-optical device and a projection optical system to project the projection light emitted from the electro-optical device.

According to the projection display device of an aspect of the present invention, since at least one of the plate and the cover that constitute the electro-optical device encased in the mounting case according to an aspect of the present invention, that is, the mounting case is made of the resin member and the metal member, it is possible to reduce or prevent the amount of the heat accumulated in the electro-optical device from significantly increasing. Therefore, it is possible to reduce or prevent dislocation of the electro-optical device in the mounting case and to reduce or prevent deterioration of the electro-optical device due to the thermal expansion and the thermal contraction of the mounting case. Therefore, according to the projection display device of an aspect of the present invention, it is possible to display high quality images.

The operations and other advantages of the present invention will be apparent from the exemplary embodiments described later.

DETAILED DESCRIPTION OF PREFERRED EMBODIMENTS

Now, exemplary embodiments of the present invention will be described with reference to the accompanying drawings.

Liquid Crystal Projection Apparatus

First, with reference to FIG. 1, an exemplary embodiment of a liquid crystal projection apparatus according to the present invention will be described on the basis of an optical system into which optical units are assembled. As an example of an electro-optical device encased in a mounting case, the projection display apparatus of the exemplary embodiment is constructed as a multi-panel color projector composed of three liquid light valves.

Figure 1:
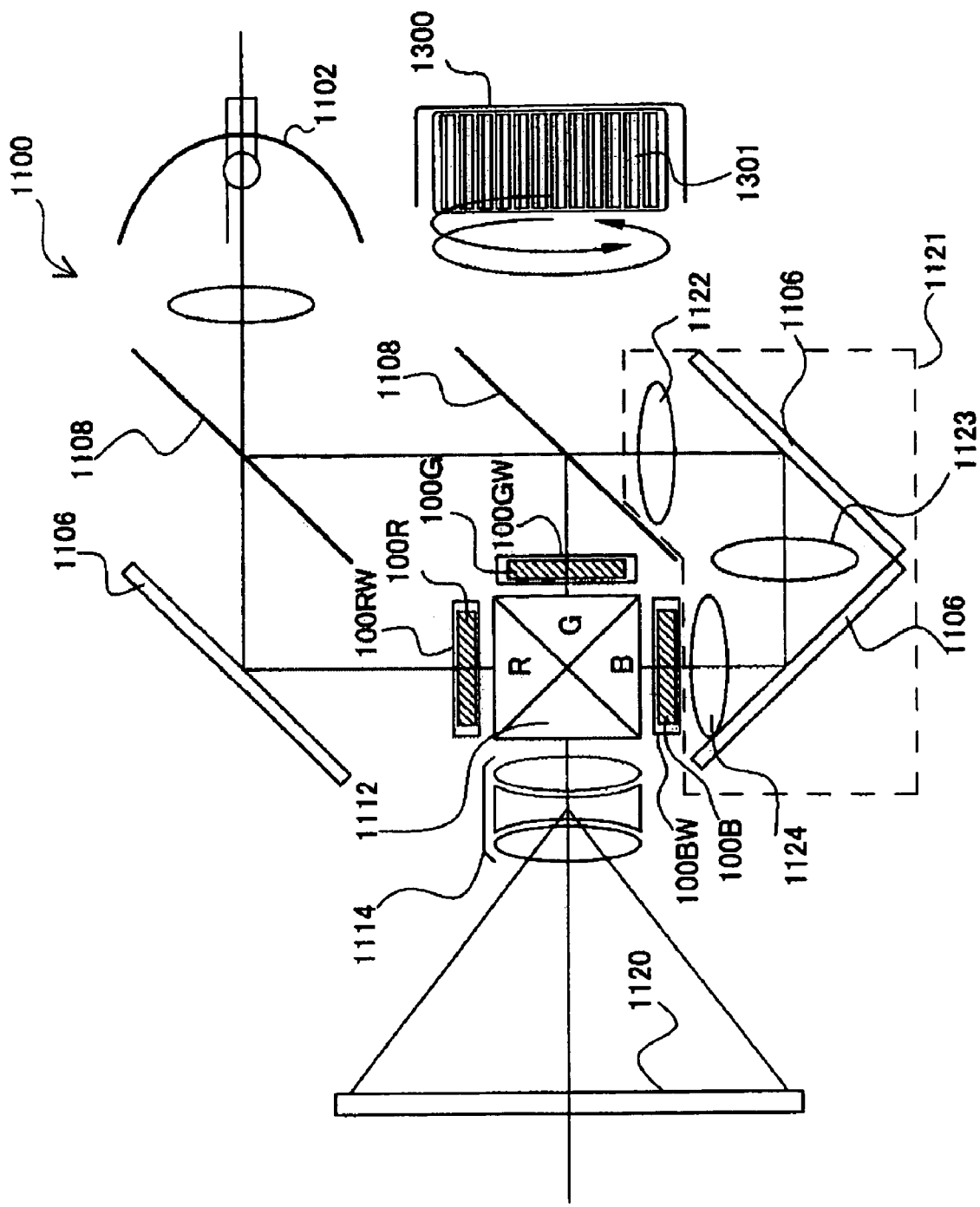
FIG. 1 is a schematic illustrating an exemplary embodiment of a projection liquid crystal apparatus according to the present invention.

In FIG. 1, a liquid crystal projector 1100, an example of the multi-panel color projector, is a projector which utilizes three liquid crystal light valves having electro-optical devices in which driving circuits are mounted on TFT array substrates as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B by three mirrors 1106 and two dichroic mirrors 1108. The light components are guided into the light valves 100R, 100G, and 100B, corresponding to the colors. In particular, the B light component is guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are synthesized by a dichroic prism 1112 and then projected on the screen 1120 as a color image through a projection lens 1114.

Active matrix drive liquid crystal apparatuses, in which TFTs are used as switching devices, are used as the light valves 100R, 100G, and 100B of the exemplary embodiment. The light valves 100R, 100G, and 100B are composed of electro-optical devices encased in the mounting cases, as described later in detail.

Further, as shown in FIG. 1, a sirocco fan 1300 to send cooling air to light valves 100R, 100G, and 100B is provided in such a liquid crystal projector 1100. The sirocco fan 1300 includes a substantially cylindrical member having a plurality of blades 1301 in the side thereof, and the blades 1301 generate wind by rotating the cylindrical member with its axis as a center. The wind generated by the sirocco fan 1300 in accordance with such a principle flows in whirls as shown in FIG. 1.

The wind is supplied to the respective light valves 100R, 100G, and 100B through an air passage not shown in FIG. 1, and blows from respective outlets 100RW, 100GW, and 100BW provided near the light valves 100R, 100G, and 100B to the light valves 100R, 100G, and 100B.

If the sirocco fan 1300 as described above is used, it is possible to obtain an advantage that the wind is easily supplied to narrow spaces around the light valves 100R, 100G, and 100B, because the wind has a high static pressure.

In the aforementioned construction, the light emitted from the lamp unit 1102, which is an intense light source, raises the temperatures of the light valves 100R, 100G, and 100B. At that time, if the temperatures rise excessively, the liquid crystal constituting the light valves 100R, 100G, and 100B may be deteriorated, or hot spots generated by the partial heating of portions of the liquid crystal panel due to the unevenness of light emitted from the light source cause variations in the transmittance. For this reason, particularly, in the exemplary embodiment, mounting cases capable of cooling the electro-optical devices are provided in the respective light valves 100R, 100G, and 100B, as described later. Therefore, it is possible to effectively suppress the rise in temperature of the light valves 100R, 100G, and 100B, as described later.

In the exemplary embodiment, a cooling device including a circulating unit for flowing a coolant in the spaces surrounding the light valves 100R, 100G, and 100B may be provided within a housing of the liquid crystal projector 1100. In this way, it is possible to further effectively cool the electro-optical device encased in the mounting case, which has a heat radiating function, as described later.

Electro-Optical Apparatus

Figure 2:
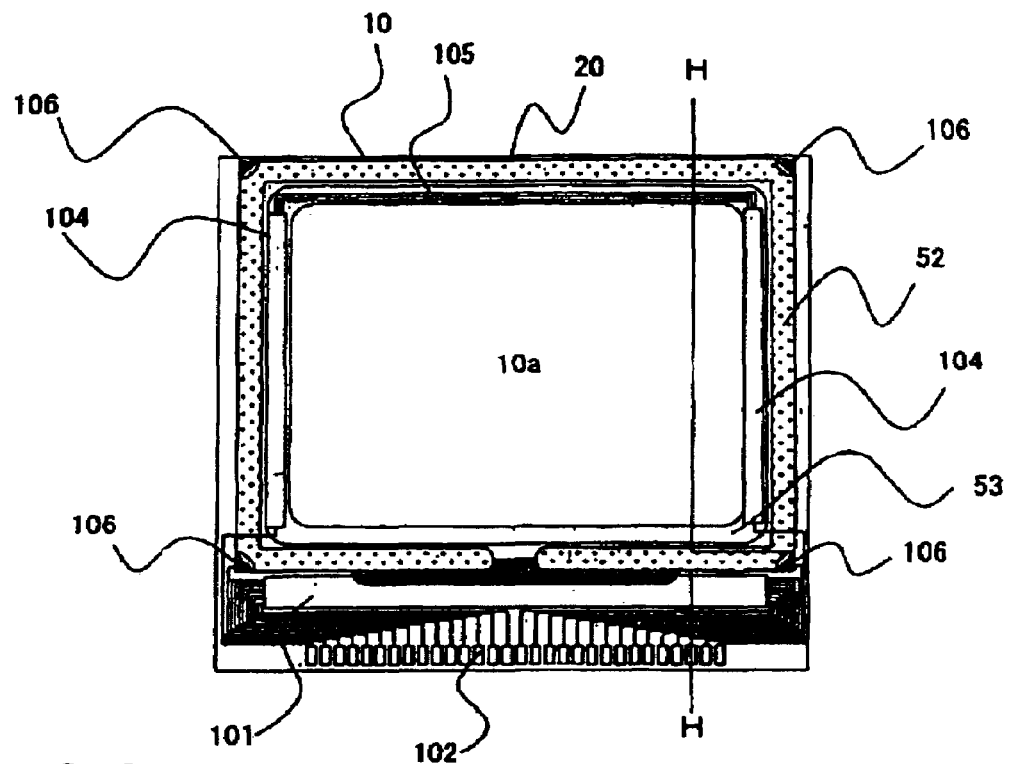
FIG. 2 is a schematic illustrating an exemplary embodiment of an electro-optical device according to the present invention.
Figure 3:
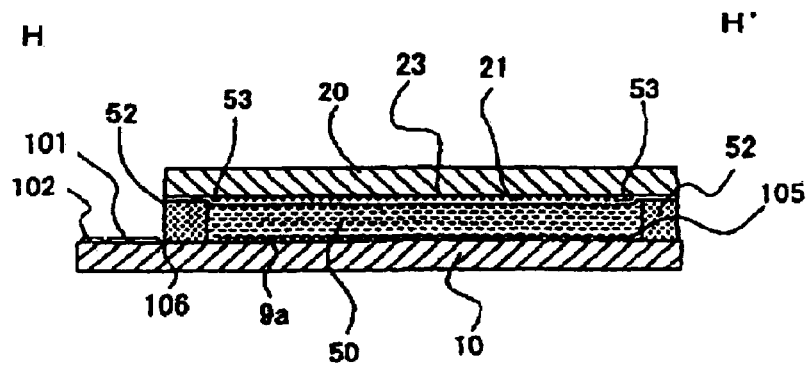
FIG. 3 is a cross-sectional view taken along the plane H-H' shown in FIG. 2.

Next, the overall construction of an electro-optical apparatus according to an exemplary embodiment of the present invention will be described with reference to FIGS. 2 and 3. Herein, a TFT active drive liquid crystal device with a built-in driving circuit is illustrated as an example of an electro-optical device. The electro-optical device according to the exemplary embodiment is used as liquid light valves 100R, 100G, and 100B of the aforementioned liquid crystal projector 1100. Herein, FIG. 2 is a plan view of the electro-optical device and illustrates a TFT array substrate and constructional components provided thereon as shown from the counter substrate. FIG. 3 is a cross-sectional view taken along the plane H-H' shown in FIG. 2.

Referring to FIGS. 2 and 3, in the electro-optical device according to the exemplary embodiment, the TFT array substrate 10 is disposed to face the counter substrate 20. A liquid crystal layer 50 is interposed and sealed between the TFT array substrate 10 and the counter substrate 20. The TFT array substrate 10 and the counter substrate 20 are bonded to each other by a seal member 52 disposed at a seal region which is located around an image display region 10a.

The seal member 52 for bonding both substrates is made of, for example, ultraviolet curable resin, thermosetting resin, and the like, which are applied on the TFT array substrate 10 and then cured by ultraviolet ray irradiation or heating in manufacturing processes. In addition, spacers made of a material, such as glass fiber or glass bead are dispersed in the seal member 52 to keep the gap between the TFT array substrate 10 and the counter substrate 20 (the gap between the substrates) at a predetermined interval. Therefore, the electro-optical device of the exemplary embodiment is used for a light valve of the projector as a small-sized device and is suitable to enlarge and displaying images.

A frame light shielding film 53 to define a frame region of the image display region 10a is provided on the counter substrate 20 parallel to the inner side of the seal region where the seal member 52 is disposed. All or a portion of the frame light shielding film 53 may be provided on the TFT array substrate 10 as a built-in light shielding film.

In the peripheral region located at the outer side of the seal region, where the seal member 52 is disposed, of a region extending to the circumference of the image display region, a data line driving circuit 101 and an external circuit connection terminal 102 are provided along one side of the TFT array substrate 10 and scanning line driving circuits 104 are provided along two sides adjacent to the one side. In order to connect the two scanning line driving circuits 104 provided along the two sides of the image display region 10a to each other, a plurality of wiring lines 105 are provided along the remaining one side of the TFT array substrate 10 so as to be covered with the frame light shielding film 53.

Further, upper and lower conducting members 106 to serve as upper and lower conduction terminals between the two substrates are disposed at four corners of the counter substrate 20. On the other hand, on the TFT array substrate 10, the upper and lower conduction terminals are provided at the regions opposite to the corners. Through these members, the electrical conduction is made between the TFT array substrate 10 and the counter substrate 20.

In FIG. 3, TFTs for pixel switching and wiring lines, such as scanning lines and data lines, are formed on the TFT array substrate 10, and then, alignment layers (not shown) are formed on pixel electrode 9a. On the counter substrate 20, a counter electrode 21 and a light shielding film 23 in a lattice or stripe shape are provided, and in addition, an alignment layer (not shown) is formed on the uppermost portion thereof. A liquid crystal layer 50, which is made of, for example, one kind of nematic liquid crystal or a mixture of plural kinds of nematic liquid crystal, takes a predetermined alignment state between a pair of alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined level to a plurality of data lines prior to the image signals, and an inspection circuit and the like to inspect the quality and defects of the electro-optical device during the manufacturing process or at the time of forwarding may be formed on the TFT array substrate 10 shown in FIGS. 2 and 3.

Figure 4:
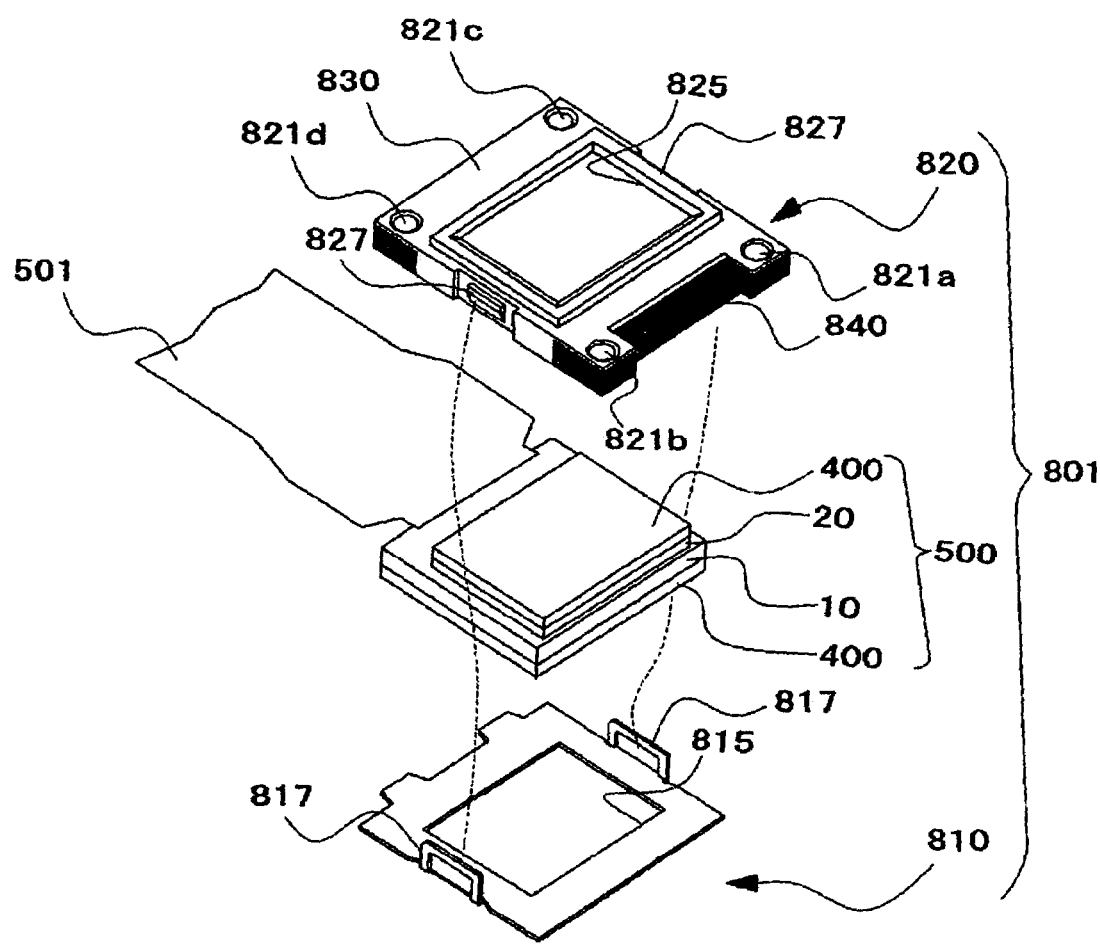
FIG. 4 is an exploded perspective schematic illustrating an electro-optical device together with a mounting case according to a first exemplary embodiment of the present invention.
Figure 5:
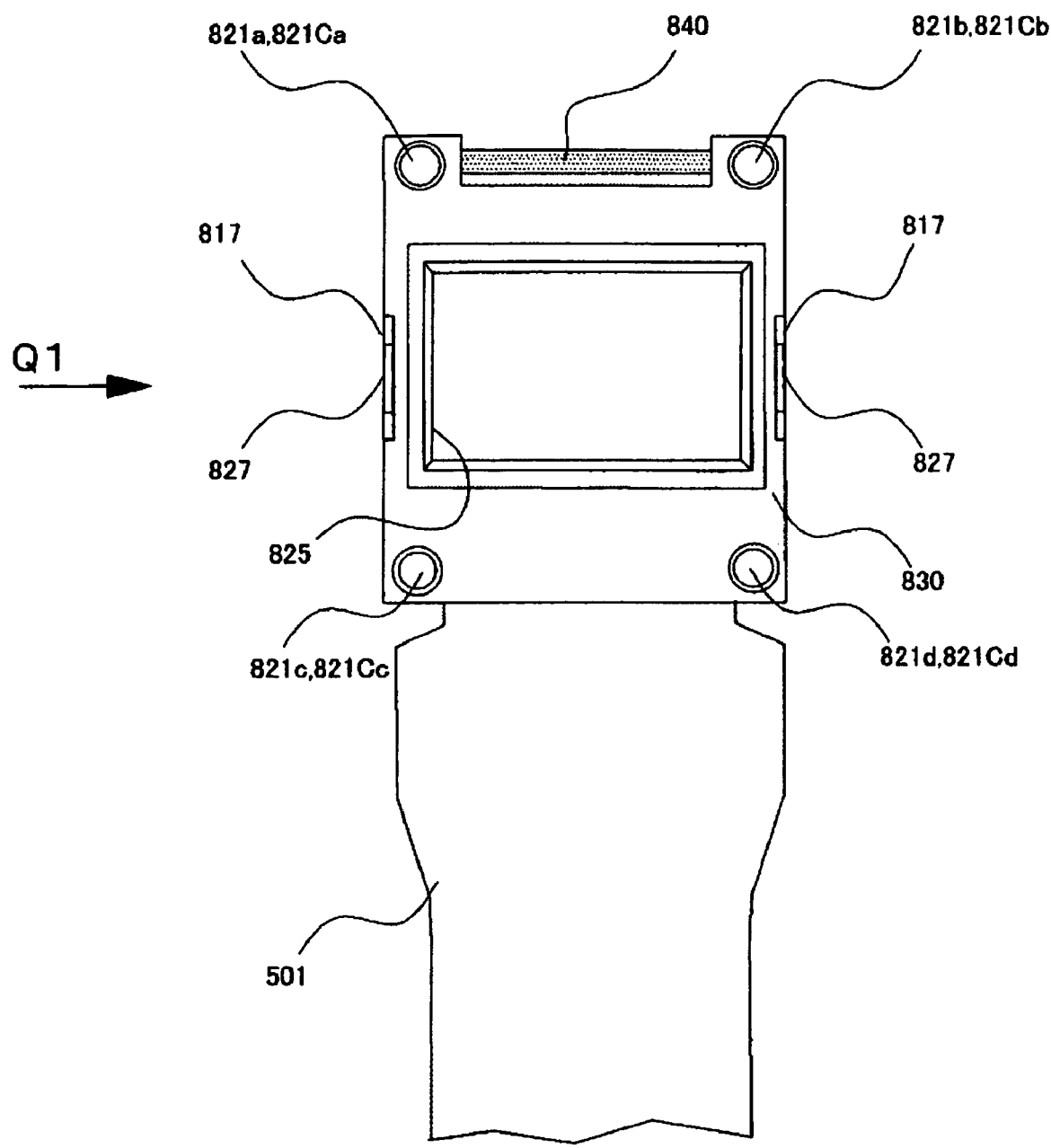
FIG. 5 is a schematic of an electro-optical device encased in the mounting case of the first exemplary embodiment.
Figure 6:
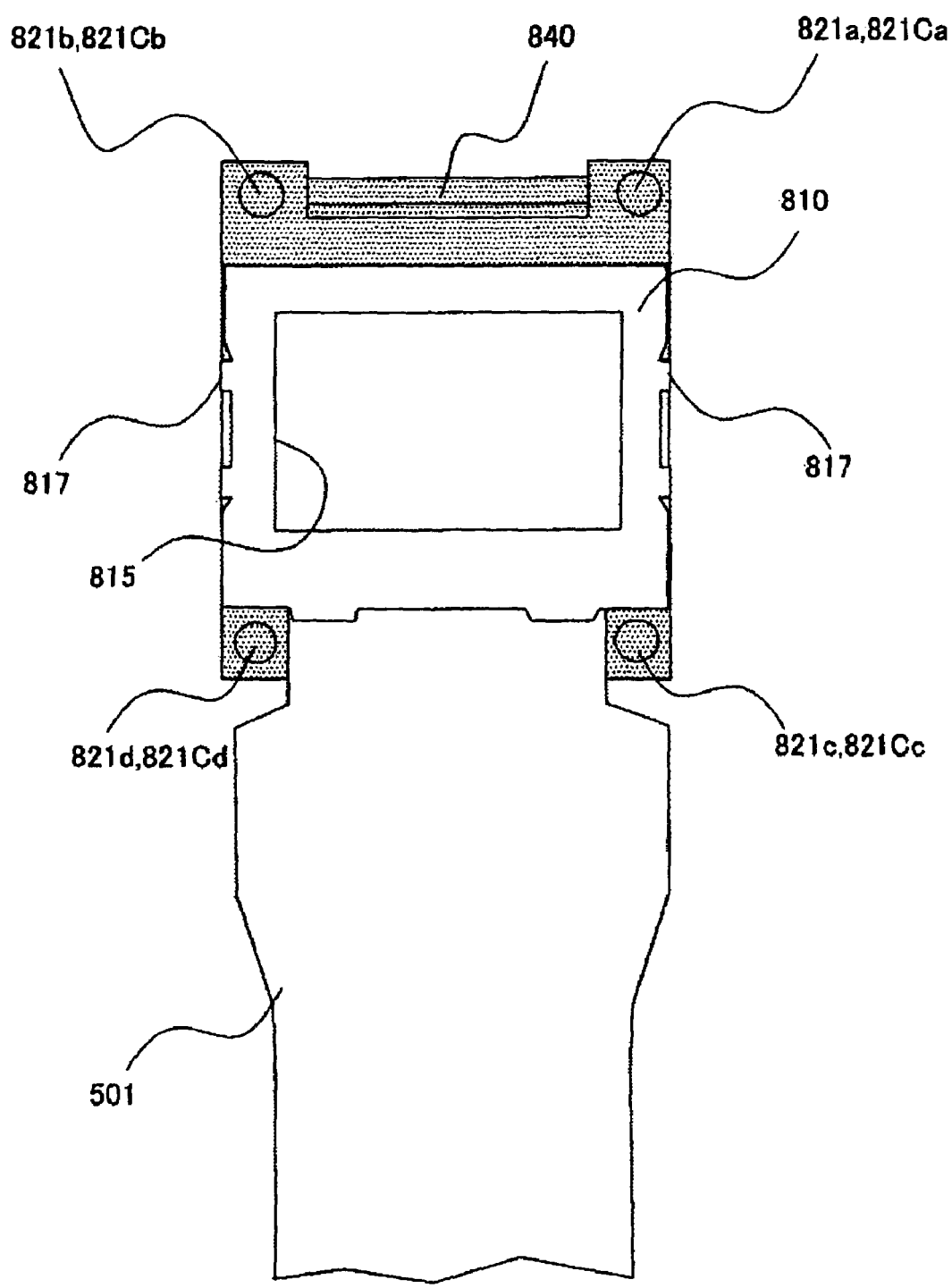
FIG. 6 is a schematic of an electro-optical device encased in the mounting case of the first exemplary embodiment.
Figure 7:
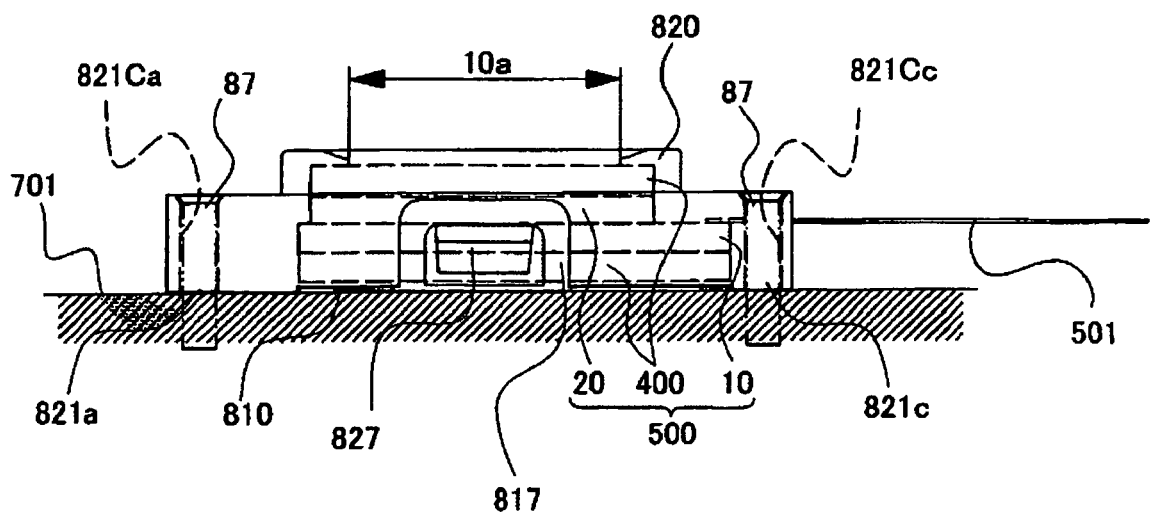
FIG. 7 is a schematic shown from the direction of Q1 shown in FIG. 5.

First Exemplary Embodiment of an Electro-Optical Device Encased in Mounting Case Next, an electro-optical device encased in the mounting case according to a first exemplary embodiment of the present invention will be described with reference to FIGS. 4 to 7. Herein, FIG. 4 is an exploded perspective view illustrating an electro-optical device together with a mounting case according to the first exemplary embodiment. FIG. 5 is a schematic of the electro-optical device encased in the mounting case, FIG. 6 is a schematic of the electro-optical device. FIG. 7 is a schematic shown from the direction of Q1 shown in FIG. 5. FIGS. 4 to 7 illustrate the mounting case in which electro-optical panels are accommodated, respectively.

As shown in FIGS. 4 to 7, the mounting case 801 includes the plate member 810 and the cover member 820. The electro-optical device 500, which is accommodated in the mounting case 801, includes the electro-optical devices shown in FIGS. 2 and 3, and another optical component, such as a reflection preventing plate overlapped with the surface thereof and a flexible connector 501 is connected to an external circuit connecting terminal. Furthermore, a polarizing plate or a retardation plate may be provided to the optical system of the projection display device, or it may be overlapped with the surface of the electro-optical device 500. Moreover, a dustproof substrate 400 is provided in portions not facing the liquid crystal layers 50 in the TFT array substrate 10 and the counter substrate 20 (see FIGS. 4 and 7). The dustproof substrate 400 has a predetermined thickness. The dustproof substrate reduces or prevents dirt or dust around the electro-optical device 500 from being directly stuck onto the surface of the electro-optical device. Therefore, it is possible to effectively remove a defect that a figure of dirt or dust appears on the magnified projection image. This is because the focus and the periphery of the light source deviates from the position (that is, the surface of the dustproof substrate 400) in which the dirt or dust exists (a defocusing operation) since the dustproof substrate 400 has the predetermined thickness.

According to the first exemplary embodiment, it is premised that light is incident light from the cover member 820, transmits through the electro-optical device 500, and is emitted from the plate member 810. That is, in FIG. 1, what faces the dichroic prism 1112 is not the cover member 820 but the plate member 810. It is possible to adopt an aspect in which light is incident light from the plate 810 and is emitted from the cover member 820.

In order to fix the peripheral region of the electro-optical device 500 encased in the internal space of the cover member 820 at the rear side, the plate member 810 has a plane plate shaped main body that faces the peripheral region. The plate member 810 has a window 815 so as to expose the image display region 10*a* of the electro-optical device 500 and engaging units 817 having small windows for fixing the main body of the plate member 810 to the cover member 820 on both sides of the front. The cover member 820 has protrusions 827 engaged with the small windows of the engaging units 817 on both sides of the front. The plate member 810 and the cover member 820 can be firmly assembled with each other by engaging the engaging units 817 with the protrusions 827. Therefore, the structure of the mounting case 801 is firm.

In order to engage the protrusions 827 with the engaging units 817, the plate member 810 is preferably made of a metal having high elasticity or a resin. Since the plate member 810 fixes the electro-optical device 500 to the cover member 820, at least parts of the plate member 810, the electro-optical device 500, and the cover member 820 have the parts that inevitably contact each other as the above-mentioned protrusions 827 and the engaging units 817. Therefore, the plate member 810 functions as a heat sink to absorb the heat generated by the electro-optical device 500. According to the first exemplary embodiment, as illustrated in FIG. 7, the plate member 810 entirely contacts the electro-optical device 500. The engaging units 817 and the protrusions 827 will now be described.

As mentioned above, the electro-optical device 500 is encased in the internal space of the cover member 820 and the plate member 810 is fixed to the cover member 820 by engaging the engaging units 817 with the protrusions 827. As a result, the electro-optical device 500 is mounted in the mounting case 801.

Figure 8:
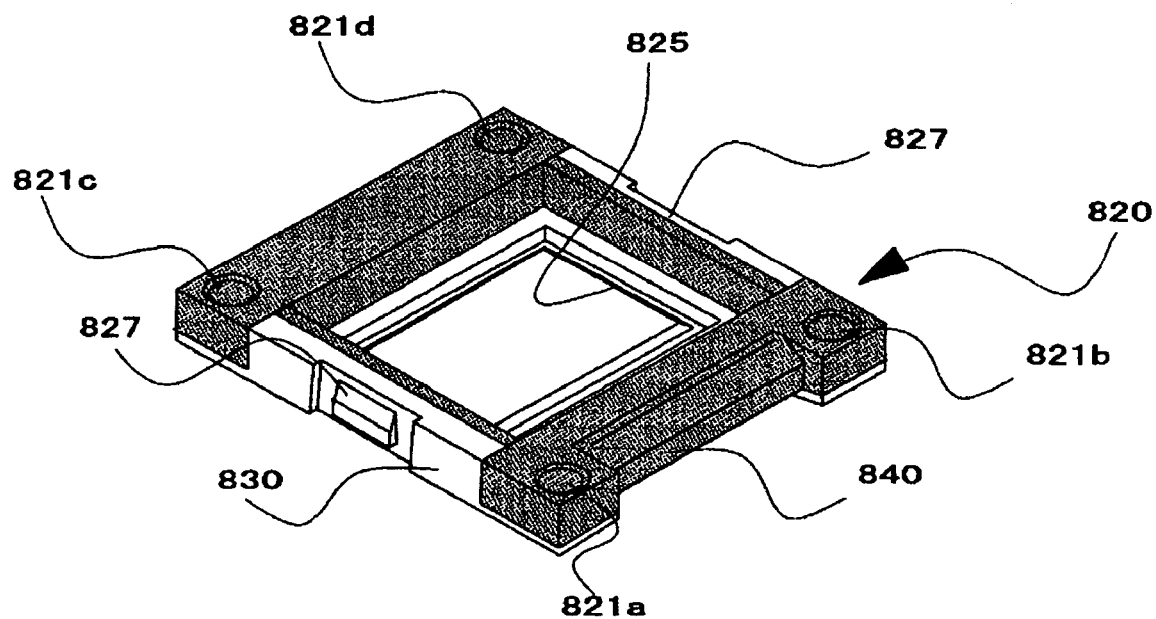
FIG. 8 is a schematic of a cover member constituting the mounting case of the first exemplary embodiment.

According to the first exemplary embodiment, in particular, the cover member 820 has the following characteristic structure. The structure of the cover member 820 will now be described with reference to FIG. 8 in addition to the above-mentioned FIGS. 4 to 7. FIG. 8 is a perspective view illustrating only the cover member 820 between the plate member 810 and the cover member 820 illustrated in FIGS. 4 to 7. Also, FIG. 8 is drawn in the direction toward the rear surface (that faces the electro-optical device 500) of the surface illustrated in FIG. 4.

As illustrated in FIG. 8, the cover member 820 includes a metal member 830 and a resin member 840. In FIGS. 4 to 8, the metal member 830 is a white part and the resin member 840 is a hatched part.

As illustrated in FIG. 8, the metal member 830 is made of a plate shaped member. A window 825 is formed in the plate shaped member so as to correspond to the image display region 10*a* of the electro-optical device 500. Light is incident light on the electro-optical device 500 through the window 825 (When the projection light travels in the opposite direction [from the plate member 810 to the cover member 820], the window 825 emits the light that passes through the electro-optical device 500). The edge of the window 825 abuts the peripheral region around the image display region 10*a* of the electro-optical device 500. Therefore, as mentioned later, it is possible to evenly transmit light from the electro-optical device 500 to the cover member 820.

The above-mentioned protrusions 827 are formed in the metal member 830. As mentioned above, the protrusions 827 are positioned on both sides when the electro-optical device 500 is viewed from the front and are capable of engaging with the engaging units 817 formed so as to correspond to the protrusions 827 in the plate member 810. When the engaging units 817 are made of a metal, heat is actively transmitted between the protrusions 827 and the engaging units 817.

As a material of the metal member 830, a material including aluminum or magnesium having high heat conductivity may be used. Therefore, it is possible to enhance the radiation property of the cover member 820. In order to reduce or prevent light leakage in the peripheral region of the electro-optical device 500 and to reduce or prevent stray light from entering the image display region 10*a* from the peripheral region, the cover member 820 may be made of a material having an excellent light shielding performance.

According to the first exemplary embodiment, the window 825 is formed in a shape of "an outward window" so as to be identical with the external shapes of the counter substrate 20 that constitutes the electro-optical device 500 and the dustproof substrate 400 that is connected to the counter substrate 20 (refer to FIG. 7, etc.). "The plate shaped member" according to an aspect of the present invention includes the metal member 830 having "the outward window" as well as "a plate" in the strict sense of the word.

However, the resin member 840 is formed on the metal member 830 so as to surround the electro-optical device 500. To be specific, as illustrated in FIG. 8, the resin member 840 is formed so as to surround the plate metal member 830 and to be substantially identical with the external shape of the electro-optical device 500. Therefore, the electro-optical device 500 is bound by the resin member 840 and is fixed to the mounting case 801 of the electro-optical device 500.

Attaching holes 821*a*, 821*b*, 821*c*, and 821*d* are formed in the resin member 840. Holes (refer to FIGS. 4 and 5) corresponding to the attaching holes 821*a* to 821*d* are formed in the metal member 830. Therefore, in FIG. 5 or 6, it is possible to pass through the attaching holes 821*a* to 821*d* from the sheet of FIG. 5 or FIG. 6 to the holes. Cylinder members 821Ca, 821Cb, 821Cc, and 821Cd are provided in the attaching holes 821*a* to 821*d*. According to the first exemplary embodiment, in particular, the internal circumferences of the cylinder members 821Ca to 821Cd are threaded so that screws 87 are screwed thereto (refer to FIG. 7). Therefore, it is possible to screw the plate member 810 to an attaching plane 701 on which the plate member is provided.

The resin member 840 may be made of, for example, an epoxy resin.

Considering that a large amount of heat from the electro-optical device 500 is transmitted to the cover member 820 and that the light from the lamp unit 1102 is irradiated onto the cover member 820, the resin member 840 is preferably made of a material having the same linear expansion coefficient as that of the metal member 830. According to such a structure, it is possible to reduce or prevent the dislocation of the electro-optical device 500 in the mounting case 801, which is caused by the extreme difference in thermal transformation between the resin member 840 and the metal member 830.

Further, a manufacturing method in which the resin member 840 is insert-molded is preferably used to manufacture the cover member 820 obtained by assembling the resin member 840 with the metal member 830.

According to the electro-optical device encased in the mounting case of the first exemplary embodiment having the above structure, it is possible to obtain the following effects. First, since the cover member 820 according to the first exemplary embodiment includes the metal member 830 and the resin member 840, it is possible to effectively gain the advantages of both the metal member 830 and the resin member 840.

To be specific, as illustrated in FIG. 4 or 8, since the resin member 840 is formed so as to surround the electro-optical device 500, it is possible to firmly fix the electro-optical device 500 into the mounting case 801. Further, since the resin member 840 is slightly transformed due to heat, even if the electro-optical device encased in the mounting case receives relatively strong light from the lamp unit 1102 (refer to FIG. 1) to cause a rise in temperature of the electro-optical device, there is little probability that the resin member 840 undergoes thermal transformation. Therefore, it is possible to firmly fix the electro-optical device 500 into the mounting case 801. Further, according to the first exemplary embodiment, since the attaching holes 821a to 821d are formed in the resin member 840, it is possible to firmly fix the cover member 820 to the projection display device. This is because the resin member 840 is slightly transformed due to heat.

Therefore, it is possible to substantially prevent dislocation of the electro-optical device 500 according to the first exemplary embodiment in consideration of the direction in which the projection light is incident light.

However, as illustrated in FIG. 4 or 8, the metal member 830 is arranged so as to contact the peripheral region around the image display region 10a in the electro-optical device 500. Therefore, it is possible to deprive the electro-optical device 500 of heat in the connection portion. In this case, since the metal member 830 has high heat conductivity, it is possible to effectively deprive the electro-optical device 500 of heat. Further, according to the first exemplary embodiment, in particular, since the protrusions 827 are provided in the metal member 830 and are engaged with the engaging units 840 of the plate member 810 that may be made of a metal, it is possible to effectively deprive the electro-optical device 500 of heat. Specifically, in this case, since the transmission path of heat, such as the electro-optical device 500, the edge of the window 825, the protrusions 827, and the engaging units 817 is formed, it is possible to effectively deprive the electro-optical device 500 of the heat. In this case, since it is possible to exhaust the heat from the electro-optical device 500 by the heat capacities of the cover member 820 and the plate member 810, it is possible to effectively cool the electro-optical device 500.

In consideration of the above, it is possible to reduce or prevent heat accumulation in the electro-optical device 500 according to the first exemplary embodiment. Therefore, according to the first exemplary embodiment, it is possible to minimize the deterioration of the characteristics of the liquid crystal layers 50 and the generation of the hot spots due to the heat accumulation. Also, it is possible to minimize the deterioration of picture quality.

As mentioned above, according to the electro-optical device encased in the mounting case of the first exemplary embodiment, it is possible to display high quality images by gaining the advantages of both the metal member 830 and the resin member 840.

Figure 9:
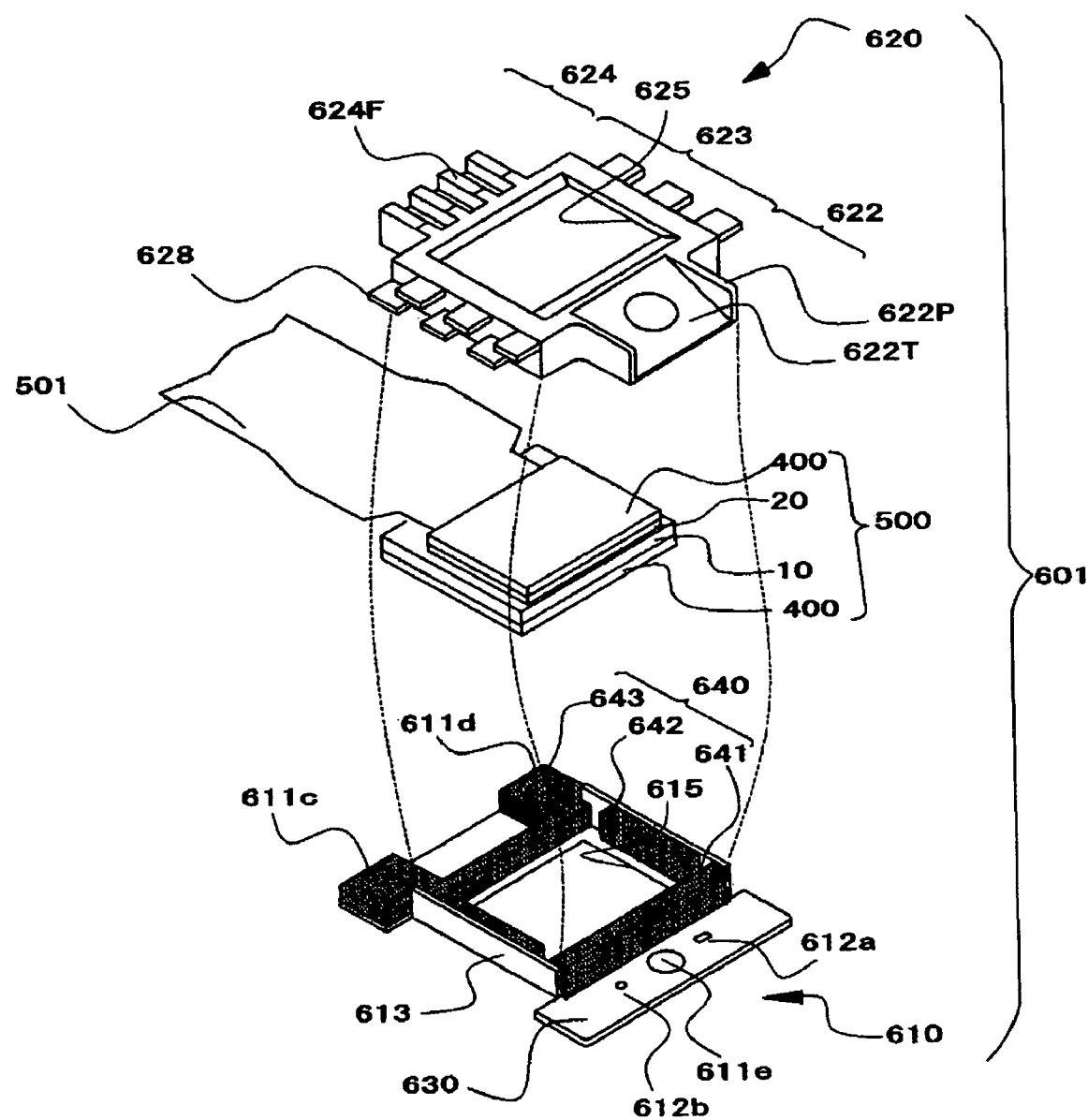
FIG. 9 is an exploded perspective schematic illustrating an electro-optical device together with a mounting case according to a second exemplary embodiment of the present invention.
Figure 10:
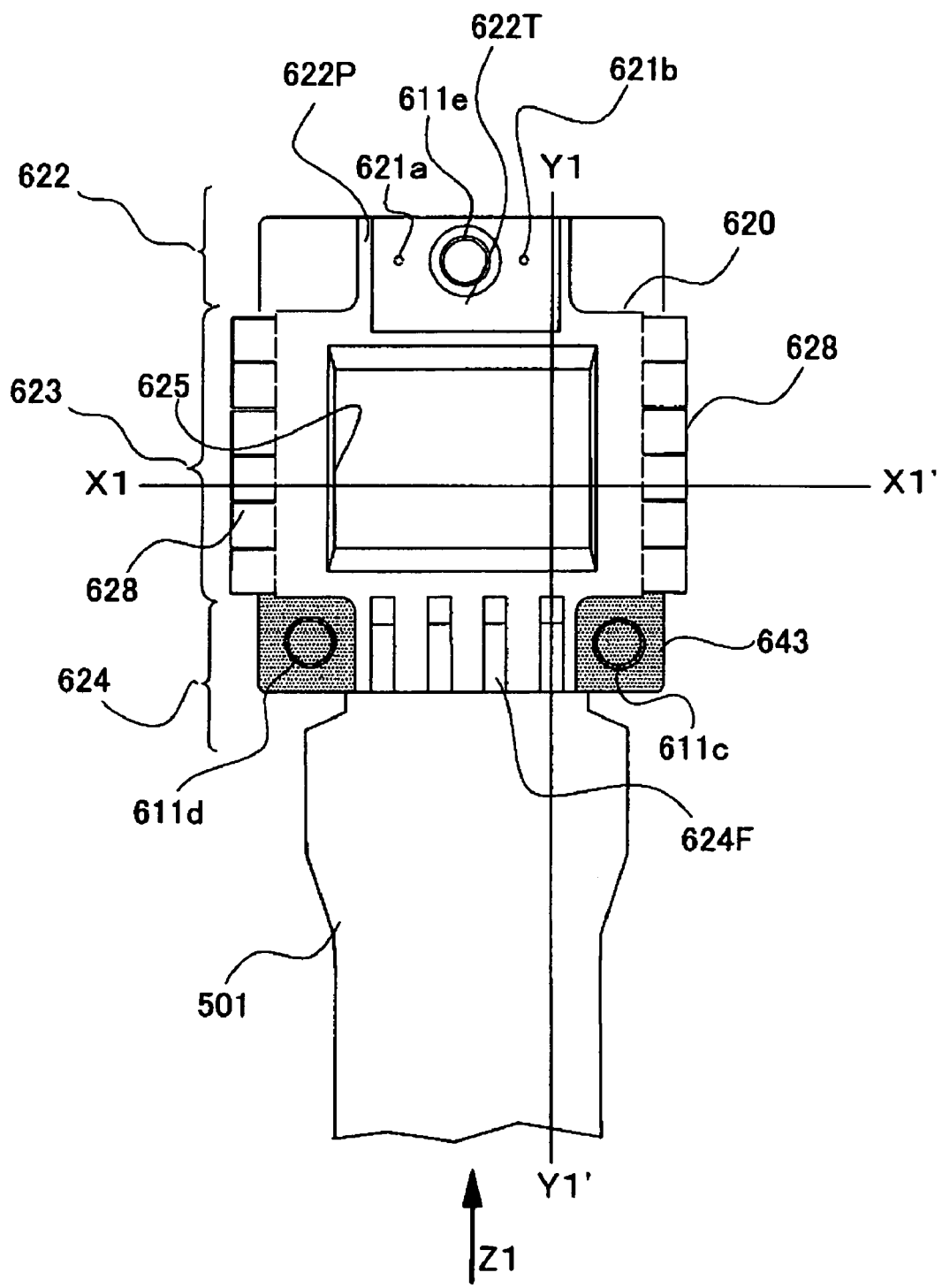
FIG. 10 is a front view of an electro-optical device encased in the mounting case of the second exemplary embodiment.
Figure 11:
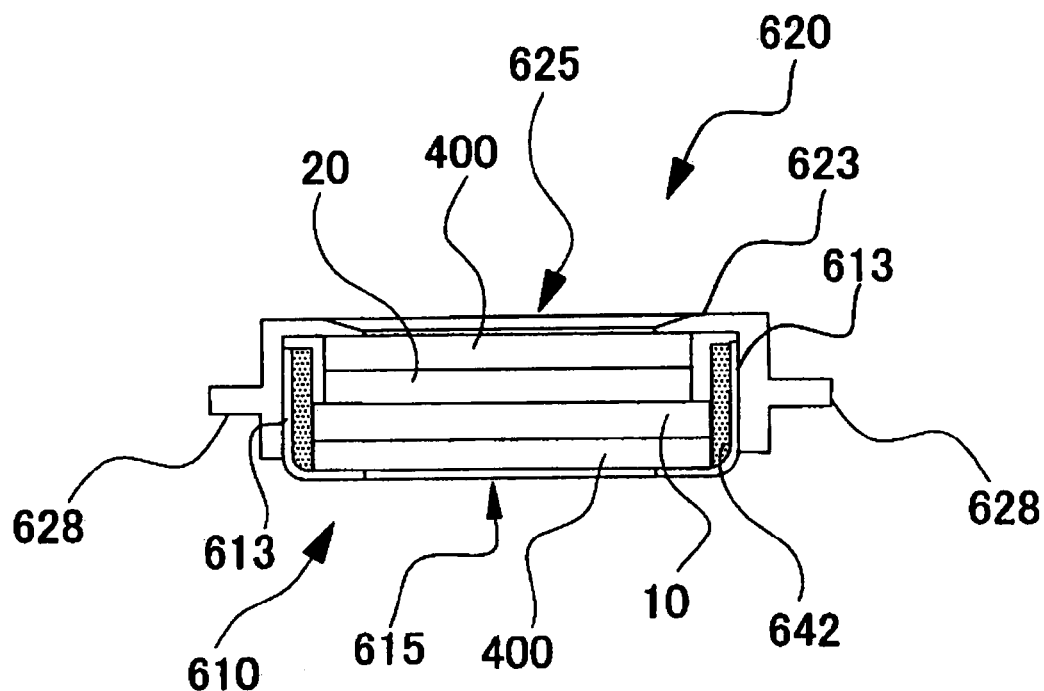
FIG. 11 is a cross-sectional view taken along the plane X1-X1' shown in FIG. 10.
Figure 12:
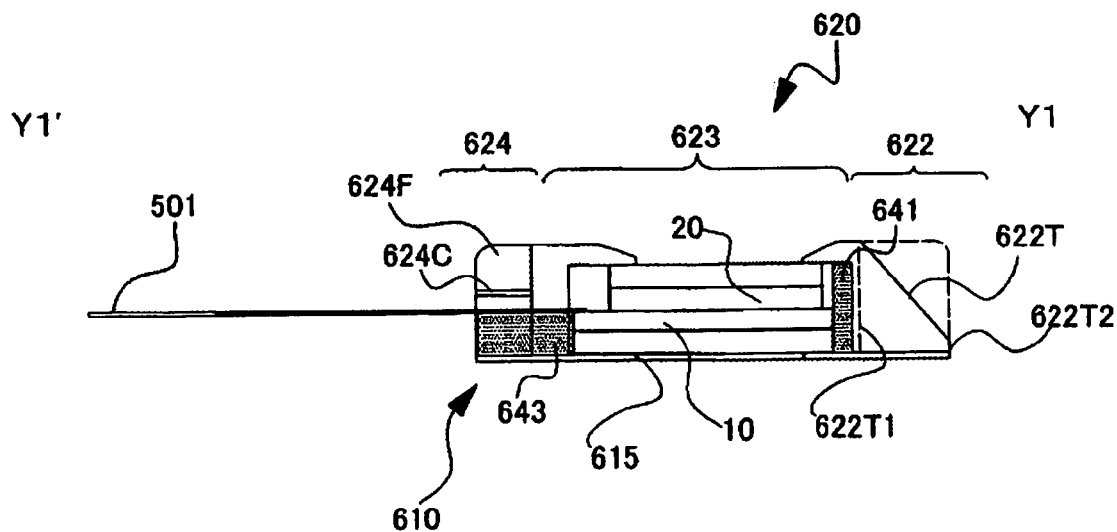
FIG. 12 is a cross-sectional view taken along the plane Y1-Y1' shown in FIG. 10.
Figure 13:
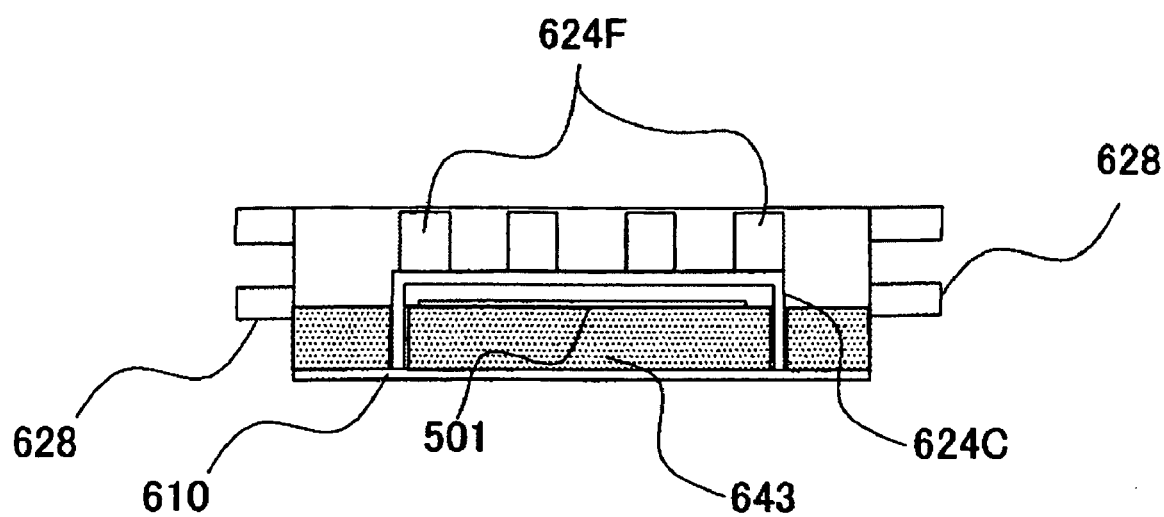
FIG. 13 is a schematic shown from the direction of Z1 shown in FIG. 10.
Figure 14:
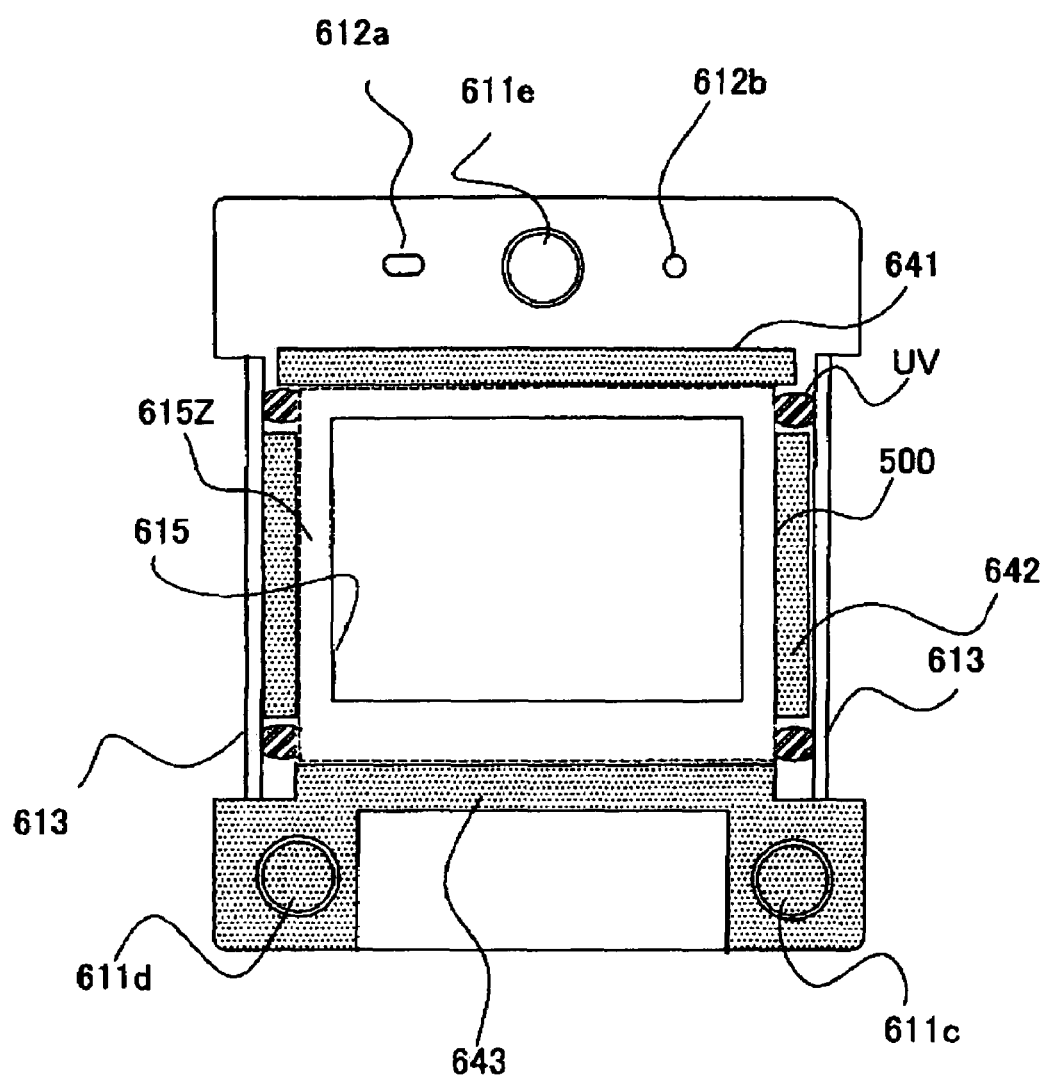
FIG. 14 is a schematic of a plate member constituting the mounting case of the second exemplary embodiment.

Second Exemplary Embodiment of an Electro-Optical Device Encased in a Mounting Case Next, an electro-optical device encased in the mounting case according to an exemplary embodiment of the present invention will be described with reference to FIGS. 9 to 13. Herein, FIG. 9 is an exploded perspective schematic illustrating an electro-optical device together with a mounting case according to the second exemplary embodiment. FIG. 10 is a schematic of the electro-optical device encased in the mounting case, FIG. 11 is a cross-sectional view taken along the plane X1-X1' shown in FIG. 10. FIG. 12 is a cross-sectional view taken along the plane Y1-Y1' shown in FIG. 10. FIG. 13 is a schematic shown from the direction of Z1 shown in FIG. 10. Further, FIG. 14 is a schematic of a plate member constituting the related mounting case. Moreover, FIGS. 9 to 13 illustrate the mounting case in which electro-optical devices are accommodated.

As shown in FIGS. 9 to 13, the mounting case 601 includes the plate member 610 and the cover member 620. The electro-optical device 500 encased in the mounting case 601 is the same as that of the first exemplary embodiment. As illustrated in FIG. 14, the electro-optical device 500 is fixed to the mounting case 601 by the ultraviolet curable resin UV provided at the four corners of the electro-optical device 500 (In FIG. 14, when the electro-optical device 500 is mounted on the plate member 610, the outer most edge of the electro-optical device 500 is marked with a dashed line). Further, in the second exemplary embodiment, it is assumed that the light that is incident light on the cover member 620, passes through the electro-optical device 500 and is emitted from the plate member 610. Specifically, referring to the FIG. 1, the component facing the dichroic prism 1112 is not the cover member 620 but the plate member 610.

The construction of the plate member 610 and the cover member 620 constituting the mounting case 601 will be described below in more detail.

First, as shown in FIGS. 9 to 14, the plate member 610 is a member having a substantially quadrilateral shape in plan view and is disposed to face one surface of the electro-optical device 500. In the second exemplary embodiment, the plate member 610 and the electro-optical device 500 are directly abutted against each other, and the latter is mounted on the former.

Specifically, the plate member 610 includes a window 615, a bent portion 613, a cover-member-fixing hole 612, and attaching holes 611e, 611d and 611c.

The window 615 is formed in an opening shape in which a portion of the member having the substantially quadrilateral shape is opened. For example, the window 615 is a member of enabling light to transmit from the upper side to the lower side in FIG. 11. The light can pass through the electro-optical device 500 by the window 615. When the electro-optical device 500 is mounted on the plate member 610, the peripheral region around the image display region 10a in the electro-optical device 500 is in an abutting state against the edge of the window 615. In this manner, the plate member 610 holds the electro-optical device 500.

The bent portion 613 is a portion formed by bending a portion of each of two opposite sides of the member having the substantially quadrilateral shape toward the inside of the quadrilateral shape. The outer surface of the bent portion 613 abuts against the inner surface of the cover member 620 when bonding the plate member 610 to the cover member 620 (see FIG. 11). The cover-member-fixing hole portion 612 is a hole portion for being engaged with a convex portion 621 provided at the corresponding location in the cover member 620. The plate member 610 and the cover member 620 are fixed to each other by engaging the cover-member-fixing hole portion 612 with the convex portion 621. In addition, in the second exemplary embodiment, the cover member fixing hole 612 includes two holes as shown in each figure (In case of need of distinguishing the holes, the two holes are referred to as cover member fixing holes 612a and 612b, respectively). Corresponding to the holes, the convex portion 621 includes two convex portions (In case of need of distinguishing the convex portions, the two convex portions are referred to as convex portions 621a and 621b, respectively).

In particular, the second exemplary embodiment is characterized in that the plate member 610 is constituted of the metal member 630 and the resin member 640, which will be described in detail later.

Next, second, the cover member 620, as shown in FIG. 9 to FIG. 13, is a member having substantially a cube shape, and is arranged to face the surface opposite to the surface facing the plate member 610 in the electro-optical device 500.

The cover member 620 is preferably made of light shielding resin, metallic material, and the like in order to reduce or prevent the leakage of the light in the peripheral region of the electro-optical device 500 and the introduction of the stray light from the peripheral region to the image display region 10a. Since it is preferable that the cover member 620 should function as a heat sink for the plate member 610 or the electro-optical device 500, the cover member 620 may be made of materials of relatively high heat conductivity, such as aluminum, magnesium, copper, or an alloy thereof.

Specifically, the cover member 620 includes the convex portion 621, a cover main body 623, a cooling air introducing portion 622 and a cooling air discharging portion 624. The convex portion 621 is used to fix the plate member 610 and includes two convex portions 621a and 621b at the locations corresponding to the cover-member-fixing holes 612a and 612b. As illustrated in FIG. 10, the convex portion 621 according to the second exemplary embodiment is formed so as to constitute a part of the cooling air introducing portion 622 and a later-mentioned tapered portion 622T (The original convex portion 621 is not illustrated, but the two convex portions are illustrated in FIG. 10).

As shown in FIGS. 9 to 13, a cover main body 623 is a member having substantially a cube shape, and is arranged between the cooling air introducing portion 622 and the cooling air discharging portion 624, which will be described below. The inside of the rectangular parallelepiped shape, in which the electro-optical device 500 is accommodated, is in the so-called hollow state. That is, the cover main body 623 is a coverless box-shaped member (According to such an expression, "the cover" mentioned here corresponds to the plate member 610).

Specifically, the cover main body 623 has a window 625 and side fin portions 628. The window 625 is formed in the bottom surface ("the top surface" in FIG. 9 or 11) of the box-shaped member having an opening and transmits light from the top to the bottom in FIG. 11. The light emitted from the lamp unit 1102, within the liquid crystal projector 1100 shown in FIG. 1, can be incident to the electro-optical device 500 through the window 625. The side fin portions 628 are formed at both sides of the cover main body 623. Both sides indicate the sides where the cooling air introducing portion 622 and the cooling air discharging portion 624, which will be described later, do not exist. Specifically, the side fin portions 628 have a plurality of zigzag arranged portions straightly protruding from the side in parallel from the cooling air introducing portion 622 to the cooling air discharging portion 624, as shown in FIG. 9 or FIG. 11. In this regard, the surface areas of the cover main body 623 and the cover member 620 increase.

Moreover, as already described, the inner surface of the cover member 620 is abutted against the outer surface of the bent portion 613 in the plate member 610 at the process of assembling the cover member 620 and the plate member 610 together (see FIG. 11). Therefore, the heat of the electro-optical device 500 is effectively transmitted to the plate member 610, the bent portion 613, and the cover member 620.

As shown in FIG. 9 or 12, etc., the cooling air introducing portion 622 is composed of a tapered portion 622T and a baffle plate 622P. In the second exemplary embodiment, the tapered portion 622T has an external shape of a substantially triangular prism with its bottom being a right triangle. In addition, the tapered portion 622T has an appearance where one side of the triangular prism in the tapered portion 622T is attached on the one side of the cover main body 623. In this case, the one side of the triangular prism includes a side interposed between a right-angle portion of the bottom of the triangular prism and an angle portion adjacent thereto. Therefore, the tapered portion 622T has a base portion 622T1 that is the highest on the side surface of the cover main body 623 ("The height" mentioned here refers to the distance from the top to the bottom in FIG. 12. In FIG. 12, a dotted line extending in the up-down direction is represented as a reference.) and a tip portion 622T2 whose height is gradually reduced from the base portion 622T1. The baffle plate 622P has a shape of a wall erected along one side between two angles except for the right-angle portion on the bottom of the triangular prism.

In terms of the aforementioned "height", the height of the baffle plate 622P is constant at any place between the base portion 622T1 and the tip 622T2 although the height of the tapered portion 622T is gradually lowered from the base portion 622T1 to the tip 622T2.

Finally, the cooling air discharging portion 624 includes a flexible connector leading portion 624C and a rear fin portion 624F as shown in FIGS. 9, 10, or 13. The flexible connector leading portion 624C is provided on one side of the cooling air discharging portion to face the side of the cover main body 623 on which the tapered portion 622T is provided. More specifically, a portion having a cross-sectional shape of a U on the side is attached by an aperture having a cross-sectional shape of a U in the downward direction of FIG. 13, as shown in FIG. 13. A flexible connector 510 connected to the electro-optical device 500 is drawn out from the space surrounded in the shape of a U.

On the other hand, the rear fin portion 624F is provided on the so-called ceiling plate having the cross-sectional shape of a U in the flexible connector leading portion 624C. Specifically, as shown in FIG. 9, 10, or 13, the rear fin portion 624F has a plurality ("four" in FIG. 11, etc.) of straight protrusion portions, which protrude from the ceiling plate in parallel, so as to correspond to the extending direction of the straight protrusion portions of the side fin portions 628 as mentioned above.

In this way, the surface area of the cover member 620 increases.

Figure 15:
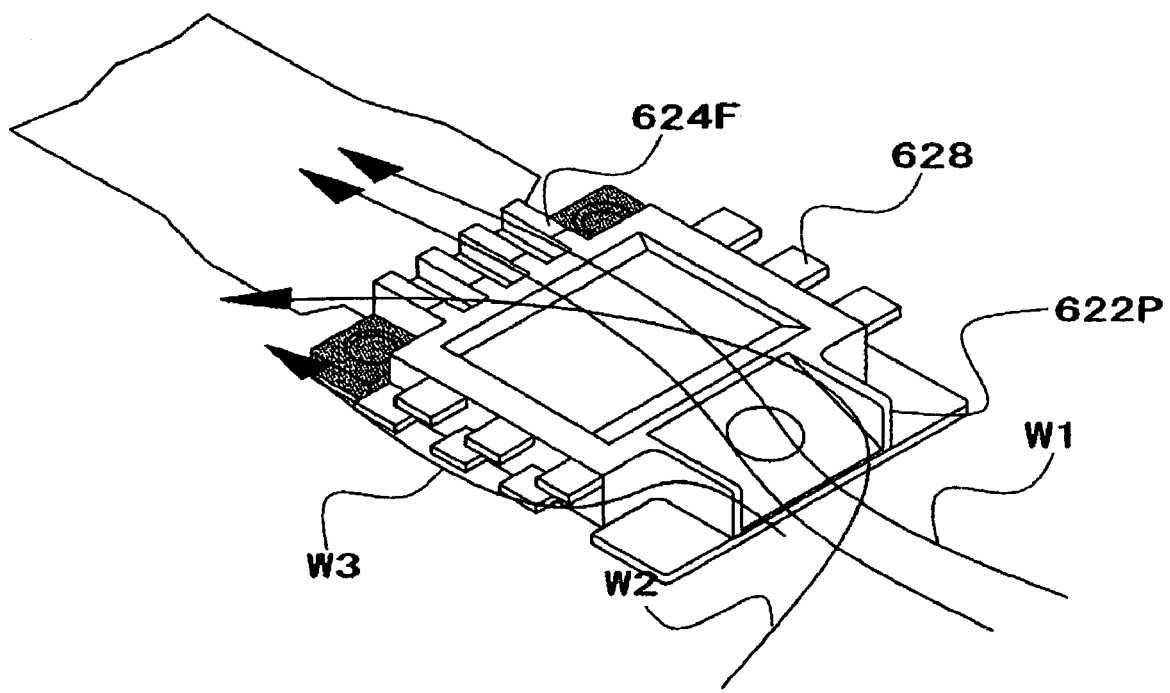
FIG. 15 is a schematic of the electro-optical device encased in the mounting case of the second exemplary embodiment and illustrates the blowing direction of wind with respect to the electro-optical device.

Since the cover member 620 has the aforementioned construction, the wind blown from the sirocco fan 1300 provided in the liquid crystal projector 1100, as shown in FIG. 1, blows as shown in FIG. 15 in the vicinity of the mounting case 601 or the cover member 620. Here, FIG. 15 is a schematic of an electro-optical device encased in the mounting case and illustrates the typical path of wind into the electro-optical device encased in the mounting case. In addition, in the liquid crystal projector 1100 shown in FIG. 1, in order to implement the path of the cooling air as shown in FIG. 15, it is necessary to provide the electro-optical device encased in the mounting case, that is, light valves 100R, 100G, and 100B, such that the outlets 100RW, 100GW, and 100BW described above with reference to FIG. 1 face the cooling air introducing portion 622 constituting the cover member 620.

The mounting case 601 according to the second exemplary embodiment is effectively cooled by the path of wind, such as cooling winds W1, W2, and W3, illustrated in FIG. 15. In addition, such a cooling method is very effective in externally radiating the heat transferred to the electro-optical device 500, the plate member 610, and the cover member 620 in this order. In particular, according to the second exemplary embodiment, it is possible to use the wind assumed not to reach the cover member 620 (the wind denoted by the reference numeral W2 in FIG. 15) to cool the mounting case 601 or the cover member 620 due to a baffle plate 622P. The side fin portion 628 and the rear fin portion 624F accelerate the cooling of the cover member 620.

Since the cover member 620 can be effectively cooled, the heat, which is transferred from the electro-optical device 500 to plate member 610 or the cover member 620 through the bent portion 613 and the like, can be effectively maintained at any time. In other words, since the cover member 620 is suitably cooled in a normal state, its function as a heat sink can be maintained at any time. Thus, the heat radiation from the plate member 610, and moreover, from the electro-optical device 500 can be effectively performed as seen from the cover member 620.

Therefore, in the second exemplary embodiment, since the heat is not excessively accumulated in the electro-optical device 500, the deterioration of the liquid crystal layers 50 and the generation of the hot spots can be reduced or prevented in advance. Thus, the deterioration of images can be greatly reduced.

Structure and Operation of Plate Member

The structure and the operation of the plate member 610 will now be described in more detail with reference to the above-mentioned respective drawings.

As illustrated in FIGS. 9 to 14, the plate member 610 includes the metal member 630 and the resin member 640. In the respective drawings, the metal member is a white part and the resin member 640 is a hatched part.

The metal member 630 is made of the plate shaped member as illustrated in FIG. 9. The above-mentioned window 615 is formed in the plate shaped member so as to correspond to the image display region 10a of the electro-optical device 500.

As a material of metal member 630, a material including aluminum or magnesium having high heat conductivity may be used. Therefore, it is possible to enhance the radiation property of the plate member 610. In order to reduce or prevent light leakage in the peripheral region of the electro-optical device 500 and to prevent stray light from entering the image display region 10a from the peripheral region, the plate member 610 may be made of a material having an excellent light shielding performance.

However, the resin member 640 is formed on the metal member 630 so as to surround the electro-optical device 500. To be specific, as illustrated in FIG. 9 or 14, the resin member 640 is constituted of a plurality of small members divided from each other. That is, in FIG. 14, the resin member 640 includes a first small member 641 corresponding to the top side of the electro-optical device 500, second small members 642 corresponding to the left and right sides of the electro-optical device 500, and a third small member 643 corresponding to the bottom side of the electro-optical device 500. As illustrated in FIG. 11, the second small members 642 are arranged so as to contact the internal surface of the bent portion 613 and the side surface of the electro-optical device 500. The third small member 643 is formed so as to have a partially notched portion (refer to FIG. 14) in plan view in order to arrange the flexible connector leading portion 624C in the cover member 620. The electro-optical device 500 is bound by the resin member 640 constituted of the first through third small members 641 to 643 and is firmly fixed to the mounting case 601 of the electro-optical device 500.

The attaching holes 611c and 61d are formed in the third small member 643 in the respective small members that constitute the resin member 640 (refer to FIGS. 9 and 10). The holes (not shown) corresponding to the attaching holes 611c and 611d are formed in the metal member 630. Therefore, it is possible to pass through the attaching holes 611c and 611d from the sheet of FIG. 14 to the holes. Cylinder members 611Cc and 611Cd are provided in the attaching holes 611c and 611d. According to the second exemplary embodiment, in particular, the internal circumferences of the cylinder members 611Cc and 611Cd are threaded so that screws (not shown) can be screwed thereto. Therefore, it is possible to screw the plate member 610 to an attaching plane on which the plate member 610 is provided.

In addition to the attaching holes 611c to 611d, an attaching hole 611e is provided in the second exemplary embodiment. The attaching hole 611e is disposed to form an isosceles triangle together with the attaching holes 611c and 611d, in plan view.

Therefore, the plate member 610 according to the second exemplary embodiment is provided on the attaching plane by fixing the plate member 610 to the plane at three points. Therefore, even if the plate member 610 is twisted, bent, or curved, it is possible to secure a correct plane and to provide the plate member 610 on the plane.

The resin member 640 may be made of for example, the epoxy resin, etc.

Considering that a large amount of heat from the electro-optical device 500 is transmitted to the plate member 610 and that the light from the lamp unit 1102 is irradiated onto the plate member 610, the resin member 640 may be made of a material having the same linear expansion coefficient as that of the metal member 630. According to such a structure, it is possible to reduce or prevent the dislocation of the electro-optical device 500 in the mounting case 601, which may be caused by the extreme difference in thermal transformation between the resin member 640 and the metal member 630.

Further, a manufacturing method in which the resin member 640 is insert-molded is preferably used to manufacture the plate member 610 obtained by assembling the resin member 640 with the metal member 630.

According to the electro-optical device encased in the mounting case according to the second exemplary embodiment having the above structure, since the plate member 610 includes the metal member 630 and the resin member 640, it is possible to effectively gain the advantages of both the metal member 630 and the resin member 640 like the cover member 820 according to the first exemplary embodiment.

According to the second exemplary embodiment, the plate member 610 is assembled with the cover member 620 not by engaging the engaging portions 817 with the protrusions 827 like in the first exemplary embodiment but by inserting the convex portions 621 into the cover-portion-fixing holes 612. However, since the cover member fixing hole 612 and the convex portion 621 may be made of the metal (for example, refer to FIG. 9), the heat is actively transmitted between the cover-portion-fixing holes 612 and the convex portions 621 like between the engaging portions 817 and the protrusions 827. Therefore, according to the second exemplary embodiment, the cooling of the electro-optical device 500 is accelerated by the active thermal transmission through the connection portion between the plate member 610 and the cover member 620. The cover-portion-fixing holes 612 and the convex portions 621 are examples of "the engaging portions" and "the engaged portions" according to an aspect of the present invention.

According to the second exemplary embodiment, like the thermal transmission path according to the first exemplary embodiment (the electro-optical device 500, the edge of the window 825, the protrusions 827, and the engaging portions 817), the thermal transmission path that effectively cools the electro-optical device 500 is the electro-optical device 500, the edge of the window 615, the bent portion 613, and the internal wall (refer to FIG. 11) of the cover member 620 that contacts the bent portion 613, further, the entire cover member 620. Therefore, it is possible to effectively deprive the electro-optical device 500 of the heat.

According to the second exemplary embodiment, in particular, since the cooling air introducing portion 622 and the side fin portion 628 are formed in the cover member 620 so that the cover member 620 can be effectively cooled, it is possible to effectively deprive the electro-optical device 500 of the heat.

According to the second exemplary embodiment, it is possible to reduce or prevent dislocation of the electro-optical device 500 in the mounting case 601 due to the resin member 640 and to reduce or prevent heat accumulation in the electro-optical device 500 due to the metal member 630. Therefore, it is possible to display high quality images.

The present invention is not limited to the aforementioned exemplary embodiments, but it can be modified without departing from the scope and spirit of the present invention. The modified electro-optical devices encased in the mounting cases, projection display apparatuses, and mounting cases also belong to the technical scope of the present invention.

What is claimed is:

1. An electro-optical apparatus, comprising:
    an electro-optical device having an image display region on which light from a light source is incident light and a peripheral region around the image display region, and
    a mounting case including a plate disposed so as to face one surface of the electro-optical device and a cover whose portion abuts against the plate, at least a portion of the peripheral region of the electro-optical device held by at least one of the plate and the cover,
    at least one of the plate and the cover include a resin member to fix the electro-optical device to the mounting case and a metal member having a window corresponding to the image display region in the electro-optical device,
    the metal member being fixed to the electro-optical apparatus by an adhesive agent disposed at an area of gaps of the resin member.

2. The electro-optical apparatus according to claim 1, the resin member provided so as to surround the electro-optical device.

3. The electro-optical apparatus according to claim 1,
    at least one of the plate and the cover including an attaching portion to attach the electro-optical device encased in the mounting case to an attached portion of a projection display device, and
    the attaching portion provided at the resin member.

4. The electro-optical apparatus according to claim 3, the attaching portion including attaching holes and cylinder members whose axes are aligned with line that pass through the centers of the attaching holes.

5. The electro-optical apparatus according to claim 1, at least one of a portion of the cover abutting against the plate and a portion of the plate abutting against the cover being made of the metal member.

6. The electro-optical apparatus according to claim 1,
    the plate including an engaging portion,
    the cover including an engaged portion to be engaged with the engaging portion, and
    at least one of the engaging portion and the engaged portion provided in the metal member.

7. The electro-optical apparatus according to claim 1, the linear expansion coefficient of the resin member being substantially the same as that of the metal member.

8. The electro-optical apparatus according to claim 1,
    the resin member and the metal member being provided in the cover,
    the metal member made of a plate shaped member including the window, and
    the resin member molded on the plate shaped member.

9. The electro-optical apparatus according to claim 1, one of the plate and the cover including the resin member and the metal member and the other including only the metal member.

10. A mounting case, comprising:
    a plate disposed so as to face one surface of an electro-optical device having an image display region on which projection light from a light source is incident light and a peripheral region around the image display region, and a cover to cover the electro-optical device, a portion of the cover abutting against the plate,
    the mounting case accommodating the electro-optical device by holding at least a portion of the peripheral region of the electro-optical device in at least one of the plate and the cover, and
    at least one of the plate and the cover including a resin member to fix the electro-optical device to the mounting case and a metal member having a window corresponding to the image display region in the electro-optical device,
    the metal member being fixed to the electro-optical apparatus by an adhesive agent disposed at an area of gaps of the resin member.

11. A projection display apparatus, comprising:
    an electro-optical device encased in the mounting case according to claim 10;
    a light source,
    an optical system to guide the projection light onto the electro-optical device; and
    a projection optical system to project the projection light emitted from the electro-optical device.

* * * * *